June 18, 1968 R. J. FUZERE 3,388,575
ALIGNMENT INDICATING AND CORRECTING TOOL
Filed Oct. 21, 1965
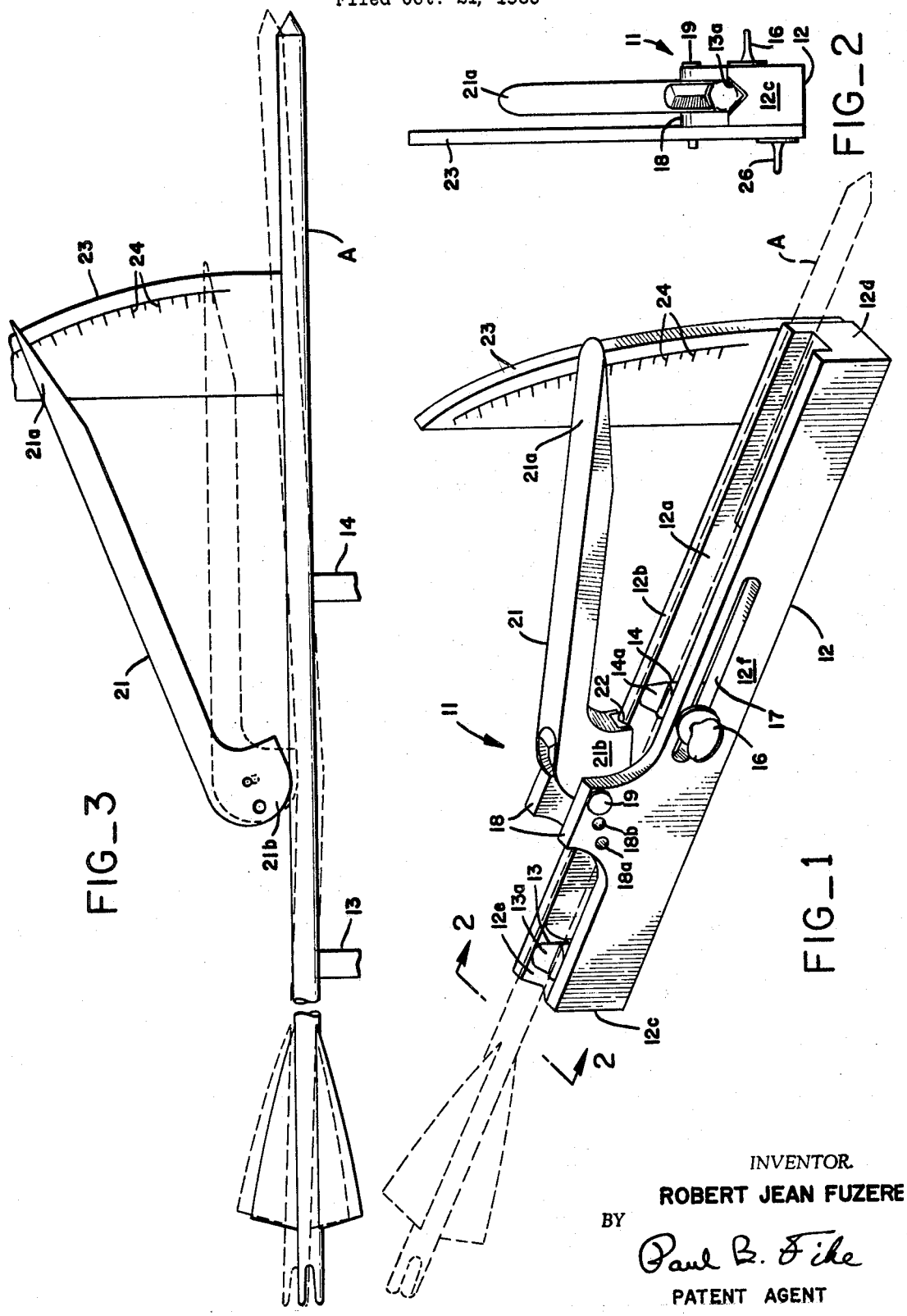
INVENTOR.
ROBERT JEAN FUZERE
BY
Paul B. Fike
PATENT AGENT

3,388,575
ALIGNMENT INDICATING AND CORRECTING TOOL
Robert Jean Fuzere, 715 Lakehaven Drive, Sunnyvale, Calif. 94086
Filed Oct. 21, 1965, Ser. No. 499,638
2 Claims. (Cl. 72—35)

This invention pertains to apparatus for straightening rods, and more particularly, to a portable tool for verifying the straightness of arrows or other rods and for adjusting their alignment.

The straightness of an arrow is extremely important to a competitor in the sport of archery. An archery tournament may be won or lost by the inadvertent firing of a crooked arrow which does not fly straight and true to its target. Consequently, serious archery enthusiasts attempt to maintain their arrows in a state of true alignment at all times. Since an archer's supply of arrows on an archery range may be limited to a reasonable number which he can carry about with him, it will be extremely useful to him to be able to verify the alignment of arrows and to do any necessary straightening thereof at the site of use.

Therefore, it is the general object of this invention to provide a tool for verifying the alignment of arrows or other rods and for correcting any indicated misalignment.

It is a particular feature of the present invention to provide a hand-operated tool for straightening arrows or other rods.

It is an additional feature of the present invention to provide a portable tool which can be used to verify alignment of rods.

It is an added feature of the present invention to provide a portable alignment indicating and correcting tool which will accommodate rods of varying diameters.

These as well as other objects and features of the invention will become more apparent from a perusal of the following description of the structure shown in the accompanying drawing wherein:

FIG. 1 is a perspective view of an alignment indicating and correcting tool embodying the present invention, FIG. 2 is an end elevation of the alignment indicating and correcting tool as seen in the direction of arrows 2—2 in FIG. 1, and FIG. 3 is a diagrammatic sketch illustrating the method by which the present invention corrects the alignment of an arrow.

The construction of an alignment indicating and correcting tool 11 of the present invention is best shown in FIGS. 1 and 2. Support for an arrow A and all of the elements of the tool 11 is provided by a cradle 12. Made preferably of masonite or other rigid material, the cradle 12 is of generally rectangular cross section and has a long rectangular channel 12a in the upper face 12b extending from one end 12c of the cradle almost to the other end 12d thereof. The remaining portion of the upper face 12b has a V-shaped groove 12e in which is embedded a nylon block 13 with a V-shaped upper surface 13a (FIG. 2). A second nylon block 14 also having a V-shaped upper surface 14a is slidably mounted within the channel 12a, the bottom of the V-block 14 being flat so that it rests slidably in an upright disposition in the rectangular channel. The two V-blocks 13, 14 are aligned and serve as discrete fulcrums on which an arrow A may be placed so that its longitudinal axis is parallel to the longitudinal axis of the cradle 12. Motion of the adjustable V-block 14 along the length of the channel is limited by a thumb screw 16 which screws into the block 14 through a slot 17 located in a side face 12f of the cradle 12. This V-block 14 may be fixed at any point within the range of its limited motion by tightening the thumb screw 16 which, of course, always travels with it. By providing flexibility of location for one V-block 14, the distance between the V-blocks 13, 14 may be adjusted according to the particular need of the straightening job to be done.

Also supported by the cradle 12 are means for applying a straightening force to an arrow A at a point between the V-blocks. On the cradle 12, approximately one quarter of the total length thereof from the fixed V-block 13 and extending upward and outward from the top channeled face of the cradle, are twin bosses 18 which cooperate with each other to provide three alternate hole locations 18a, 18b (18c is obscured by the head of the pivot pin) for a pivot pin 19 at one of three different heights above the line of support defined by the V-blocks 13, 14. An arm 21, pivotally mounted between the bosses 18 on the pin 19, is provided for applying mechanical pressure to the arrow A. By gripping the free end 21a of the arm 21, which incidentally is pointed, between one's fingers and pushing it downward toward the cradle 12, an arrow or other rod-like member may be bent as much as desired within predetermined limits. The means by which pivoting of the arm 21 produces pressure on the arrow A is illustrated in FIG. 3. The pivoted bottom end 21b of the rotary arm 21 includes a V-shaped "Teflon" insert 22 that defines a curve of constant radius. The pivot pin 19, however, is located in the rotary arm 21 at a point eccentric to the radial center of the curve. Therefore, pivoting of the arm 21 results in a camming action which forces the arrow A down to the phantom-line disposition in FIG. 2 when the arm 21 is moved downward.

The camming relationship which enables a straightening force to be applied to the arrow A also enables the arm 21 to indicate misalignments in the arrow. When the arm 21 is resting on the arrow A with no force being applied other than that of gravity, any vertical motion of the arrow A relative to the line of support of the V-blocks 13, 14 is reflected in motion of the arm 21 about its pivot pin 19. In this connection, the arrow A that is shown in FIG. 3 may be considered as a misaligned arrow instead of one which is being bent downward by a force applied to the torque arm 21. When a bent portion of the arrow A passes under the torque arm 21, the position of that portion relative to the arrow portions resting on the V-blocks 13, 14 is either higher or lower and the arm 21 will accordingly deviate from a position that it would have if the arrow A were perfectly straight.

Relative motion of the arm 21 is made obvious by a curved scale 23 which extends upwardly from the other end 12c of the cradle opposite the fixed V-block 13. The scale 23 has graduated markings 24 on its curved edge and its disposition on the cradle 12 is such that the pivot pin 19 for the arm 21 is approximately at the radial center of the scale. By selecting an appropriate one of the pivot pin locations 18a, 18b, 18c in the bosses 18 to accord with the diameter of an arrow A that is being aligned, the range of angular pivotal motion for the arm 21 may be made to coincide with the front of the scale as viewed in FIG. 1. Since the length of the arm 21 is such that its free end 21a swings in an arc that coincides with the curved contour of the scale 23, angular deflection of the rotary arm is easily observable in measurable units.

For improved portability, the scale 23 is fastened to the cradle by a thumb screw 26 (FIG. 2). The screw 26 may be loosened and retightened to secure the scale 23 in a position (not shown) which is substantially parallel to the cradle and which permits the tool to be carried in a coat pocket.

In FIG. 2 it may be observed also that arrows A of varying diametrical size may be accommodated. Not only is there a V-shaped surface on the top face of each V-block 13, 14 but the curved arrow-contacting insert 22 of the arm 21 also has an indented V-shaped surface. Regardless of the size of an arrow A placed in the cradle, the arrow A tends to center itself when the rotary arm presses it against the V-blocks.

In practice, the operation of the alignment indicating and correcting tool 11 is quite easy and gives good results. The arm 21 is pivoted upward away from the body of the cradle 12 and an arrow A is inserted, as shown in FIG. 1, so that it rests on the V-blocks 13, 14. The arm is pivoted downwardly until the insert 22 rests on the top of the arrow A. Then the arrow is twisted about its own longitudinal axis and movement of the pointed end 21a of the arm 21 relative to the scale graduations 24 will indicate the arrow is bent. By simply continuing the rotation of the arrow on its longitudinal axis until the bent portion causes the arm 21 to achieve a maximum reading on the scale 23, the arrow A may be properly placed in position for bending back into a straight line. The arm 21 is pushed downward to bend the arrow A and then released so that a new reading on the scale 23 may be observed. Again the arrow A must be rotated to observe both the high and low readings on the scale 23 to verify that the difference between them has been made smaller by the recent bending. If the remaining misalignment, as reflected by the difference between the high and low readings exceeds a permissible limit then the arrow A is turned again to its high point and the bending repeated. By successive applications of bending pressure in this manner, each crooked portion in the arrow A may be substantially removed, and satisfactory alignment achieved.

It may be seen from the foregoing that this invention provides a novel alignment indicating and correcting tool which may be applied not only to arrows but to any rod-like member of a comparable diameter. The tool is easily folded and carried about to enable aligning operations to be performed at any location where an arrow or rod-like member is to be used.

Various modifications and/or alterations in the described apparatus can be envisioned without departing from the spirit of the present invention, and such foregoing description is accordingly to be considered only as exemplary and not in a limiting sense. The actual scope of the invention is to be indicated only by reference to the appended claims.

I claim:
1. An arrow indicating and correcting tool comprising:
a cradle,
a first supporting block on said cradle,
a second supporting block slidably mounted on said cradle, and coacting with said first block to form a line of support for an arrow,
adjustable tightening means for fixing the location of said second block on said cradle relative to said first block,
means on said cradle providing a plurality of pivot locations, each location being at a different distance from the line of support,
an indicating arm pivotally mounted to said cradle at one of said pivot locations for applying mechanical force to the arrow between said blocks, and
a scale on said cradle for coacting with said arm to indicate the deviation of a portion of an arrow between said blocks from the line of support.
2. An alignment correcting tool comprising:
a cradle,
a first block on said cradle having a V-shaped surface for supporting a cylindrical body thereon,
a second block on said cradle spaced apart from said first block,
said second block having a V-shaped surface for supporting a cylindrical body thereon and aligned with said first block, and
means associated with said cradle for applying force to a cylindrical body supported on said first and second blocks,
said force-applying means being adjustable to accommodate cylindrical bodies of various diameters.

References Cited

UNITED STATES PATENTS

| | | | |
|---|---|---|---|
| 2,876,822 | 3/1959 | Groves | 72—34 |
| 3,126,773 | 3/1964 | Taylor et al. | 72—33 |

CHARLES W. LANHAM, *Primary Examiner.*

R. D. GREFE, *Assistant Examiner.*